(12) United States Patent
McGregor

(10) Patent No.: US 9,082,057 B2
(45) Date of Patent: Jul. 14, 2015

(54) RF DEVICE WITH TAMPER DETECTION

(75) Inventor: Michael McGregor, Morgan Hill, CA (US)

(73) Assignee: Intelleflex Corporation, San Jose, CA (US)

(*) Notice: Subject to any disclaimer, the term of this patent is extended or adjusted under 35 U.S.C. 154(b) by 655 days.

(21) Appl. No.: 12/806,748

(22) Filed: Aug. 19, 2010

(65) Prior Publication Data

US 2011/0043339 A1    Feb. 24, 2011

Related U.S. Application Data

(60) Provisional application No. 61/235,184, filed on Aug. 19, 2009.

(51) Int. Cl.
*H04Q 5/22* (2006.01)
*G06K 19/073* (2006.01)

(52) U.S. Cl.
CPC .......... *G06K 19/07372* (2013.01); *H04Q 2213/13095* (2013.01)

(58) Field of Classification Search
USPC ............... 340/10.1–10.6, 572.1–572.9; 235/375–385
See application file for complete search history.

(56) References Cited

U.S. PATENT DOCUMENTS

| | | | | |
|---|---|---|---|---|
| 3,469,198 A * | 9/1969 | Madsen | ........................ | 329/316 |
| 3,952,261 A * | 4/1976 | Hara et al. | ..................... | 331/1 R |
| 4,524,349 A * | 6/1985 | Hyatt | ............................ | 340/500 |
| 4,942,315 A * | 7/1990 | Tarng | ............................. | 327/72 |
| 5,153,880 A * | 10/1992 | Owen et al. | .................... | 714/710 |
| 5,161,157 A * | 11/1992 | Owen et al. | .................... | 714/710 |
| 5,499,023 A * | 3/1996 | Goldschmidt | ........... | 340/870.37 |
| 5,710,526 A * | 1/1998 | Nauta et al. | ...................... | 331/25 |
| 6,348,677 B2 * | 2/2002 | Aurre et al. | .................... | 219/518 |
| 6,348,861 B1 * | 2/2002 | Li | ................. | 340/547 |
| 6,421,751 B1 * | 7/2002 | Gulick | .......................... | 710/107 |
| 6,646,550 B1 * | 11/2003 | Runyon et al. | ................ | 340/541 |
| 6,693,511 B1 * | 2/2004 | Seal | ............................ | 340/10.1 |
| 6,757,840 B1 * | 6/2004 | Pawlowski | ................... | 714/6.32 |
| 6,888,509 B2 * | 5/2005 | Atherton | ....................... | 343/718 |
| 6,894,885 B2 * | 5/2005 | Asaka et al. | .................. | 361/143 |
| 6,922,173 B2 * | 7/2005 | Anderson | ...................... | 343/701 |
| 6,960,998 B2 * | 11/2005 | Menard et al. | ........... | 340/539.19 |
| 7,049,962 B2 * | 5/2006 | Atherton et al. | ........... | 340/572.1 |

(Continued)

FOREIGN PATENT DOCUMENTS

| | | | | |
|---|---|---|---|---|
| EP | 116701 A1 * | 8/1984 | ............ | G08B 13/14 |
| EP | 549193 A2 * | 6/1993 | ............. | G06F 11/20 |

(Continued)

*Primary Examiner* — George Bugg
*Assistant Examiner* — Paul Obiniyi
(74) *Attorney, Agent, or Firm* — Zilka-Kotab, PC

(57) ABSTRACT

A Radio Frequency Identification (RFID) system according to one embodiment includes communication circuitry for enabling wireless communication with an RF reader; energy harvesting circuitry for generating an electric current from RF energy; a sensor loop coupled to the energy harvesting circuitry; and a status register coupled to the sensor loop for indicating a broken or unbroken status of the sensor loop. A method according to one embodiment includes generating an electric current in a Radio Frequency Identification (RFID) device, the current energizing a sensor loop; detecting a status of whether the sensor loop is broken or unbroken; storing the status in at least one of a status register and a nonvolatile memory; receiving a query from an RFID reader for the status; and sending the status to the RFID reader.

19 Claims, 3 Drawing Sheets

(56) References Cited

U.S. PATENT DOCUMENTS

| | | | |
|---|---|---|---|
| 7,081,815 B2 * | 7/2006 | Runyon et al. | 340/541 |
| 7,119,690 B2 * | 10/2006 | Lerch et al. | 340/572.1 |
| 7,135,973 B2 * | 11/2006 | Kittel et al. | 340/568.2 |
| 7,256,695 B2 * | 8/2007 | Hamel et al. | 340/572.1 |
| 7,274,289 B2 * | 9/2007 | Kerr et al. | 340/500 |
| 7,276,977 B2 * | 10/2007 | Self | 331/11 |
| 7,388,493 B2 * | 6/2008 | Lerch et al. | 340/572.1 |
| 7,400,253 B2 * | 7/2008 | Cohen | 340/572.1 |
| 7,410,103 B2 * | 8/2008 | Nagel | 235/492 |
| 7,532,120 B2 * | 5/2009 | Estevez et al. | 340/572.1 |
| 7,616,116 B2 * | 11/2009 | Ehrensvard et al. | 340/571 |
| 7,740,130 B2 * | 6/2010 | Wallace et al. | 198/810.02 |
| 7,786,867 B2 * | 8/2010 | Hamel et al. | 340/572.1 |
| 7,942,258 B2 * | 5/2011 | Wallace et al. | 198/810.02 |
| 8,041,884 B2 * | 10/2011 | Chang | 711/103 |
| 8,063,307 B2 * | 11/2011 | Bukshpun et al. | 174/102 SC |
| 8,219,767 B2 * | 7/2012 | Yoshii et al. | 711/162 |
| 2001/0023868 A1 * | 9/2001 | Aurre et al. | 219/518 |
| 2002/0067264 A1 * | 6/2002 | Soehnlen | 340/572.1 |
| 2003/0074530 A1 * | 4/2003 | Mahalingaiah et al. | 711/117 |
| 2004/0066296 A1 * | 4/2004 | Atherton | 340/572.1 |
| 2004/0113790 A1 * | 6/2004 | Hamel et al. | 340/572.1 |
| 2004/0201475 A1 * | 10/2004 | Menard et al. | 340/539.17 |
| 2004/0227682 A1 * | 11/2004 | Anderson | 343/742 |
| 2005/0242962 A1 * | 11/2005 | Lind et al. | 340/572.8 |
| 2005/0275537 A1 * | 12/2005 | Kerr et al. | 340/568.2 |
| 2006/0214789 A1 * | 9/2006 | Posamentier et al. | 340/545.6 |
| 2006/0244101 A1 * | 11/2006 | Uematsu et al. | 257/533 |
| 2007/0011360 A1 * | 1/2007 | Chang et al. | 710/5 |
| 2007/0029384 A1 * | 2/2007 | Atherton | 235/435 |
| 2007/0120381 A1 * | 5/2007 | Ehrensvard et al. | 292/307 R |
| 2007/0210173 A1 * | 9/2007 | Nagel | 235/492 |
| 2007/0278068 A1 * | 12/2007 | Wallace et al. | 198/810.02 |
| 2007/0285244 A1 * | 12/2007 | Tucker et al. | 340/572.1 |
| 2007/0285248 A1 * | 12/2007 | Hamel et al. | 340/572.1 |
| 2008/0018467 A1 * | 1/2008 | Estevez et al. | 340/572.1 |
| 2008/0079587 A1 * | 4/2008 | Rofougaran et al. | 340/572.7 |
| 2008/0198011 A1 * | 8/2008 | Leper | 340/572.1 |
| 2008/0270680 A1 * | 10/2008 | Chang | 711/103 |
| 2009/0015413 A1 * | 1/2009 | Gelabert et al. | 340/572.1 |
| 2009/0132875 A1 * | 5/2009 | Kitahara et al. | 714/721 |
| 2009/0219139 A1 * | 9/2009 | Slesinski | 340/10.1 |
| 2010/0060428 A1 * | 3/2010 | Lee et al. | 340/10.1 |
| 2010/0308970 A1 * | 12/2010 | Rofougaran et al. | 340/10.1 |
| 2010/0308997 A1 * | 12/2010 | Rofougaran et al. | 340/572.7 |
| 2011/0221569 A1 * | 9/2011 | Hamel et al. | 340/9.1 |
| 2012/0068827 A1 * | 3/2012 | Yi et al. | 340/10.1 |

FOREIGN PATENT DOCUMENTS

| | | | | |
|---|---|---|---|---|
| EP | 1126372 A1 * | 8/2001 | | G06F 11/20 |
| EP | 1394810 A1 * | 3/2004 | | G11C 29/00 |

* cited by examiner

RF DEVICE WITH TAMPER DETECTION

RELATED APPLICATIONS

This application claims priority to U.S. Provisional Patent Application No. 61/235,184 filed on Aug. 19, 2009, which is herein incorporated by reference.

FIELD OF THE INVENTION

The present invention relates to Radio Frequency (RF) systems, and more particularly, this invention relates to Radio Frequency (RF) and Radio Frequency Identification (RFID) devices providing tamper detection.

SUMMARY

A Radio Frequency Identification (RFID) system according to one embodiment includes communication circuitry for enabling wireless communication with an RF reader; energy harvesting circuitry for generating an electric current from RF energy; a sensor loop coupled to the energy harvesting circuitry; and a status register coupled to the sensor loop for indicating a broken or unbroken status of the sensor loop.

A Radio Frequency Identification (RFID) system according to another embodiment includes communication circuitry for enabling wireless communication with an RF reader; energy harvesting circuitry for generating an electric current from RF energy; a sensor loop coupled to the energy harvesting circuitry; a status register coupled to the sensor loop for indicating a broken or unbroken status of the sensor loop, wherein the RFID system is passive, wherein the sensor loop is external to a housing coupled to the communication circuitry and energy harvesting circuitry, wherein the sensor loop is coupled to a sensor node and also to ground, a first resistor between the energy harvesting circuitry and the sensor node; and a second resistor between the ground and the sensor node.

A Radio Frequency Identification (RFID) system according to yet another embodiment includes communication circuitry for enabling wireless communication with an RF reader; energy harvesting circuitry for generating an electric current from RF energy; a sensor loop coupled to the energy harvesting circuitry; and a status register coupled to the sensor loop for indicating a broken or unbroken status of the sensor loop, wherein the system is not disabled if the sensor loop is broken.

A method according to one embodiment includes generating an electric current in a Radio Frequency Identification (RFID) device, the current energizing a sensor loop; detecting a status of whether the sensor loop is broken or unbroken; storing the status in at least one of a status register and a nonvolatile memory; receiving a query from an RFID reader for the status; and sending the status to the RFID reader.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
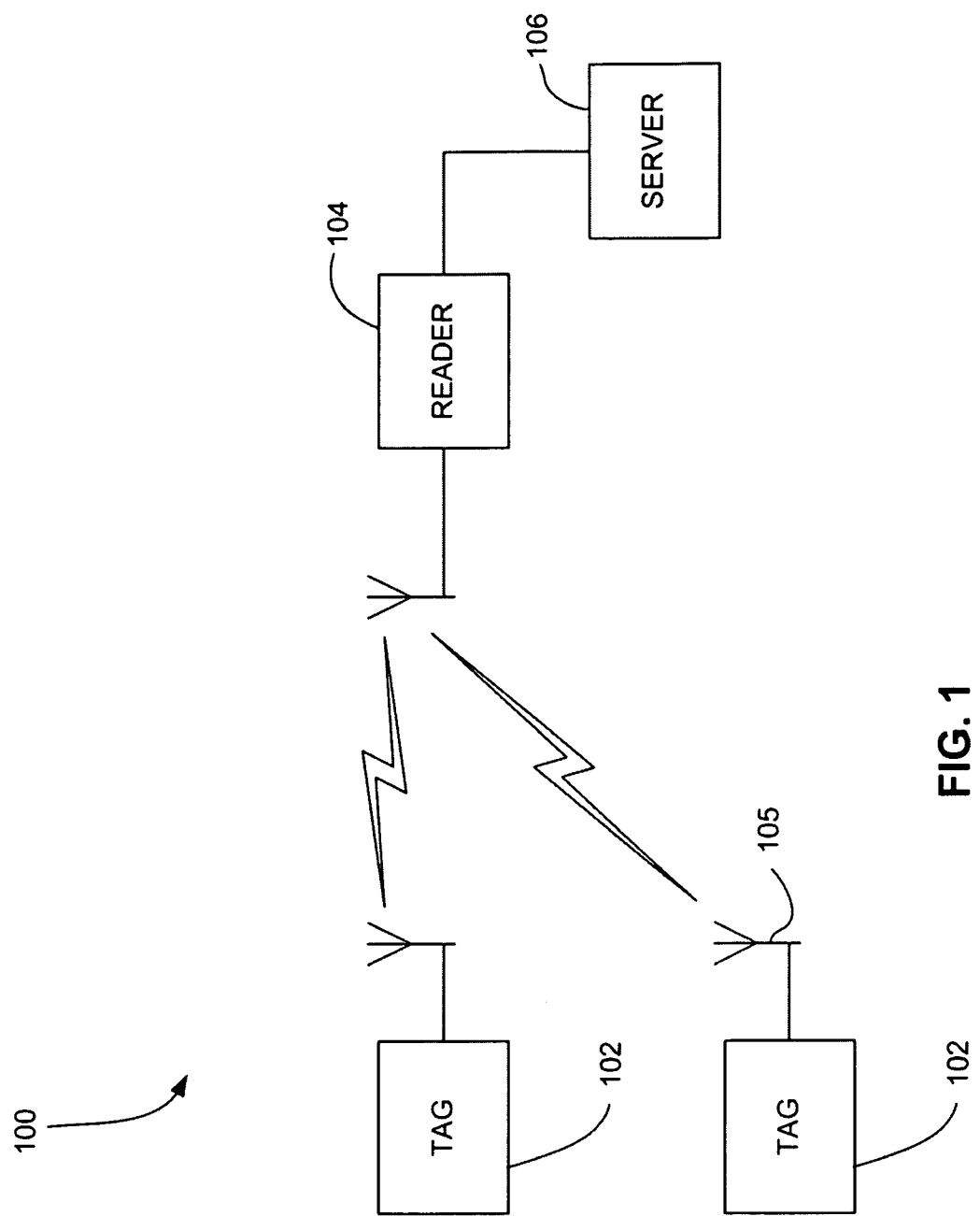
FIG. 1 is a system diagram of an RFID system.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits. a serial number, to identify unique items. A typical EPC number contains:
1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
  Identity tags (RF user programmable, range ~3 m)
  Lowest cost
Class-2
  Memory tags (20 bit address space programmable at ~3 m range)
  Security & privacy protection
  Low cost
Class-3
  Semi-passive tags (also called semi-active tags and battery assisted passive (BAP) tags)
  Battery tags (256 bits to 2M words)
  Self-Powered Backscatter (internal clock, sensor interface support)
  ~100 meter range
  Moderate cost
Class-4
  Active tags
  Active transmission (permits tag-speaks-first operating modes)
  ~300 to ~1,000 meter range
  Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
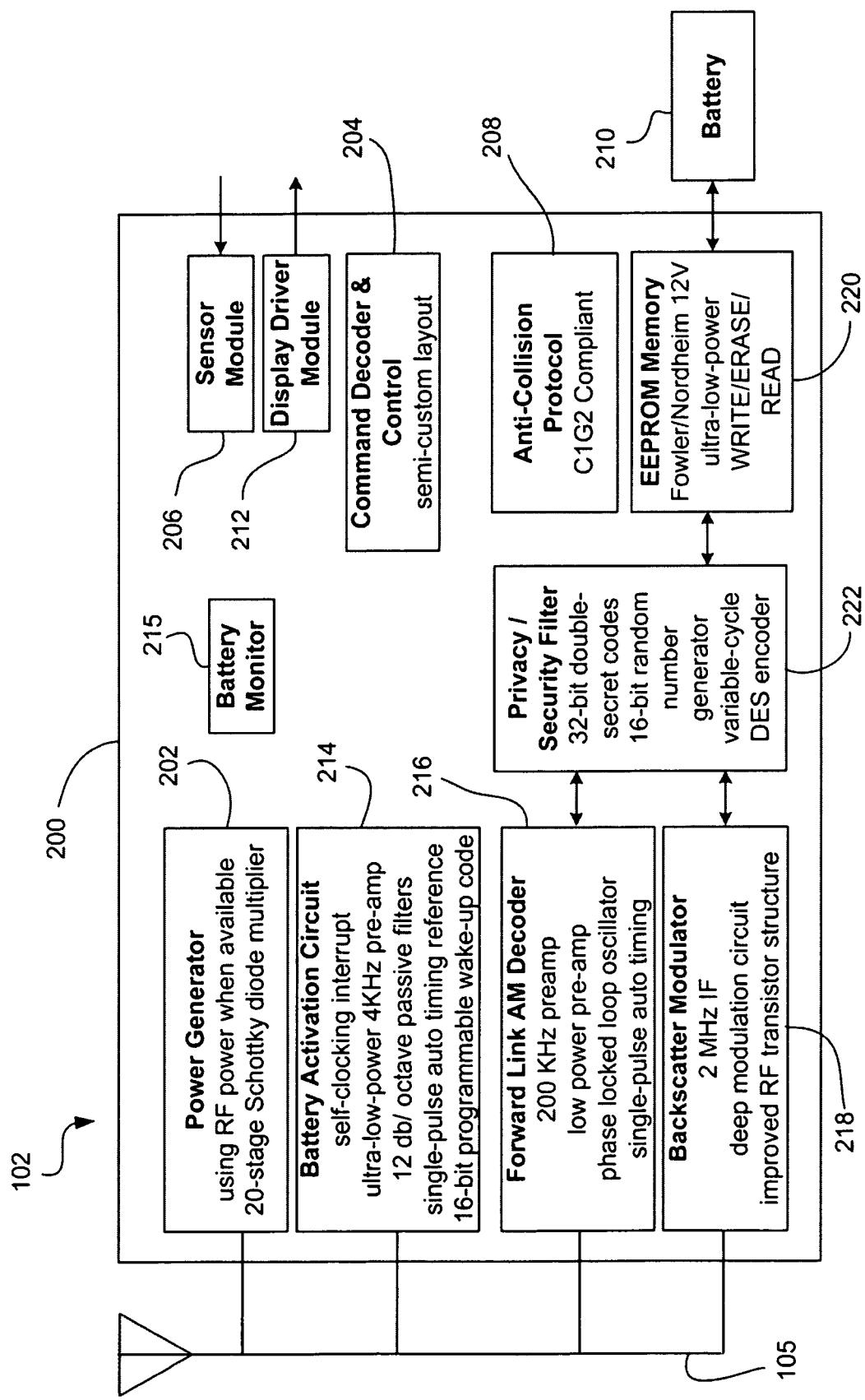
FIG. 2 is a system diagram for an illustrative integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 $\mu$A/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

In one embodiment, a passive RFID device may be used to detect, and optionally wirelessly report, tampering. Such detection and/or reporting may be performed without requiring an onboard power supply (such as a battery) in one approach, but rather can be powered by the RF energy harvesting circuit (e.g., including charge pump CP and Regulator in FIG. 3 and/or supplemental power source.

Figure 3:
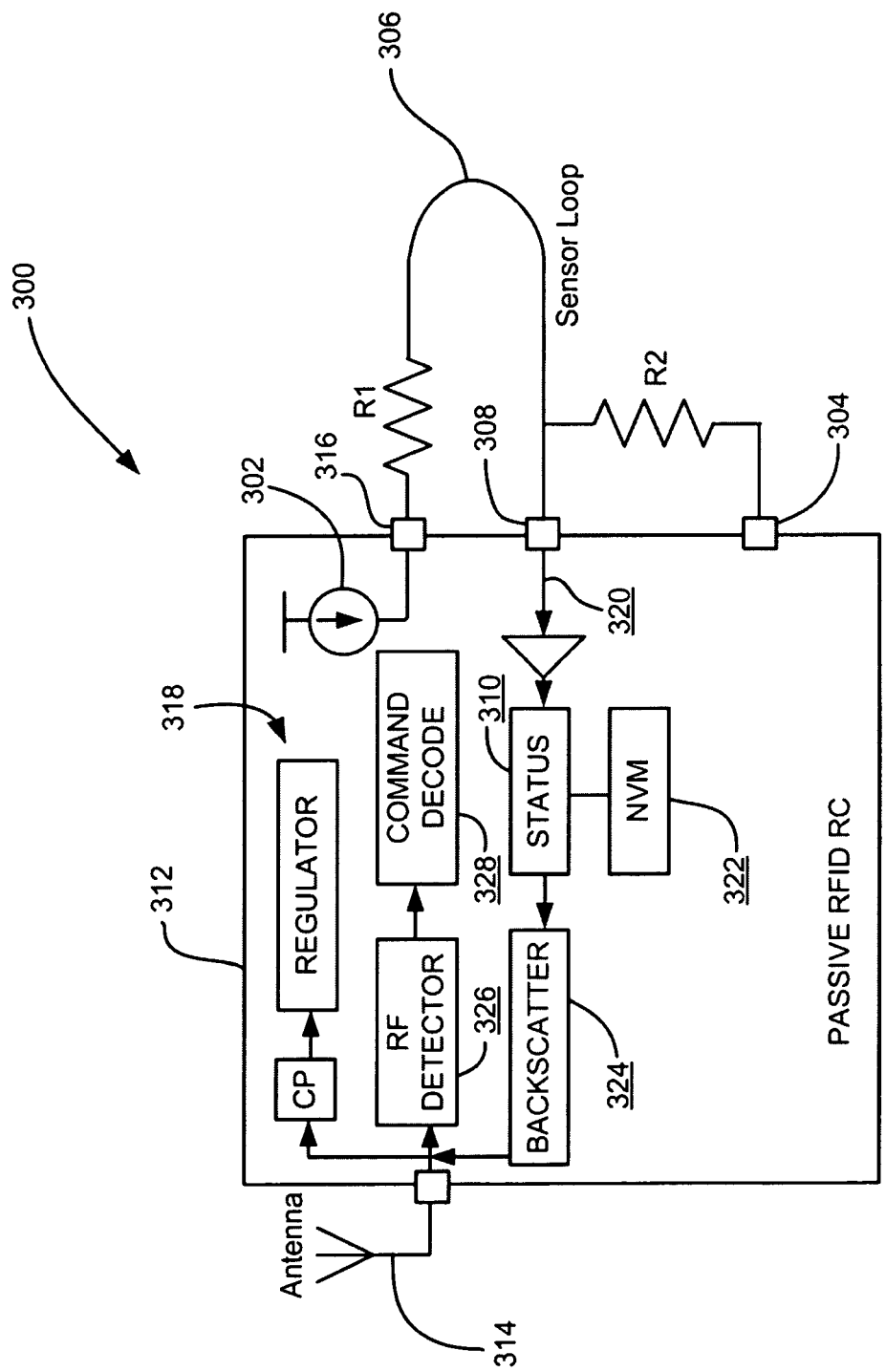
FIG. 3 is a diagram of a system according to one embodiment.

FIG. 3 depicts an illustrative system 300 that includes a simple loop that includes a current source 302, ground 304, and a sensor loop 306 extending between the current source 302 and a sensor input node 320 and ground 304.

As noted above, the current source 302 may include an RF energy harvesting circuit. The current source 302 can also be a supplemental power source.

If the sensor loop 306 is intact, the sensor input node 320 will be at some voltage. If the sensor loop 306 is broken (e.g., by tampering), the sensor input node 320 will be at ground.

A status register 310 (defined herein as anything that can indicate a status) indicates the state of the sensor loop 306 based on the voltage on the input node. The status register 310 can be a true register, a device simply storing a flag, a memory storing an indication of the status, etc. The status register 310 may receive the output of a sensor coupled to the sensor input node 320, where the sensor detects the voltage on the sensor input node 320. One illustrative sensor is a comparator that compares the voltage on the sensor input node 320 to ground to determine if the voltage is higher than ground. In another approach, a comparator compares the voltage on the sensor input node 320 to some predetermined voltage value or range. In yet another approach, a voltmeter detects any voltage about ground, a voltage a predetermined amount of millivolts above ground, etc.

When and/or how often the status register 310 is updated may be a function of availability of power from the current source 302. For example, the status register 310 may be updated each time the current source 302 supplies power, e.g., whenever the RF energy harvesting circuit is receiving enough RF energy to power the IC. In another approach, the status register 310 may be updated periodically, e.g., as where the system 300 is in an environment where sufficient RF energy is constantly being received.

The status register 310 can preferably be queried wirelessly. For example, a remote interrogator may query the system 300 for the status of the status register 310. Moreover, a remote interrogator may query the system 300 for an instantaneous status of the state of the sensor loop 306, where the status of the sensor loop 306 may or may not be stored in the status register 310, but is detected on demand.

Note that in another approach, the detection and/or reporting may take advantage, at least in part, of an onboard power supply such as a battery.

Referring to FIG. 3, in one preferred embodiment, the RF system 300 includes a passive RFID chip 312 coupled to an antenna 314, and includes circuitry 324, 326, 328 for RF communication and RF power harvesting. The chip has three pads 304, 308, 316. The top pad 316 is coupled to a current source 302 (e.g., 1-10 microamps, or higher or lower), which receives power from the harvesting circuit 318. The middle pad 308 is coupled to a status register 310 which indicates the status of the sensor loop 306 as conducting or not, and the lower pad 304 is coupled to the chip's ground.

A sensor loop 306 is coupled to the pads. The sensor loop 306 is a conductive path, and may include a thin wire, foil path, conductive polymer path, printed conductive path, cable plugged into sockets, etc. The sensor loop may or may not be electrically insulated. If the sensor loop 306 is conducting, and the current source 302 energizes the sensor loop 306, the sensor input node 320 will be at some voltage, e.g., some % of the internal chip voltage depending on the values of optional resistors R1 and R2. Thus, R1 and R2 may be selected to provide the desired voltage at the sensor node 308.

If the sensor loop 306 is broken (e.g., severed, detached from the tag IC, etc. due to tampering, mishandling, abuse, etc.), the sensor input node 320 will be at ground via the connection to ground with resistor R2.

In a particularly preferred approach, the sensor loop 306 is external to the device, and coupled thereto via pads, plug and socket arrangement, etc.

The status register can be interrogated wirelessly to report that the sensor loop 306 has been broken. Thus, the tag is preferably not disabled if the sensor loop 306 is broken.

As an option, a nonvolatile memory (NVM) 322 may be present to store the status of the sensor loop 306 e.g., by storing the status of the status register 322, by direct write by the IC, etc. The NVM 322 may be part of the status register, may be dedicated memory for storing the status, may be system memory that is shared for other uses, etc. When reporting, the status stored in the nonvolatile memory may be sent in addition to the status register status or as an alternative thereto. One benefit of storing the status in a nonvolatile memory is that if the sensor loop 306 is broken then reconnected, the broken status may be stored in the nonvolatile memory even though the status register may indicate an unbroken sensor loop 306. Historical data may also be stored, such as timestamped loop status data. This information may be useful for determining when the loop was broken.

In other approaches, the status register 310 may also be designed to indicate a broken sensor loop e.g., permanently, until reset by an authorized entity, etc., even if the conductive path of the loop is repaired after being broken. The status register and/or NVM may also store a timestamp indicating, e.g., when the last status was taken, when a broken status was detected, etc.

There is thus provided a passive device capable of sensing and reporting that the continuity of the loop has been broken.

In another approach, the various components and subsystems may be present on discrete chips and/or circuits, as opposed to all on one chip. In a further approach, R1 and R2 may be integrated in the chip.

Applications of the present system include, for example, baggage handling and various types of electronic seals that can to be electronically interrogated.

In an example of use, one may place the sensor loop 306 in a location relative to an object, doorway, etc. such that tampering with the object, doorway, etc. would result in breaking the sensor loop 306.

In operation, an RFID tag or other RF device implementing a system according to one embodiment may generate an electric current e.g., from an incident RF signal using an energy harvesting circuit. Some of this current may be used to power the IC of the tag, and some of the current may be used to create a voltage on the sensor loop. If the sensor loop is broken, the status register indicates that the sensor loop has been broken. The status of the status register may be stored in a memory, preferably a nonvolatile memory. Upon a reader querying the tag, the tag may respond with the status of the status register and/or the status stored in the memory, e.g., via known RF communication techniques. The reader may then output an indication of the status.

In any of the embodiments, techniques and/or hardware known in the art may be used to implement the various operations.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) system, comprising: communication circuitry for enabling wireless communication with an RF reader; energy harvesting circuitry for generating an electric current from RF energy;
    a status register circuit;
    a sensor loop coupled to the RFID system at three pads, the three pads including:
    a first pad coupled to a current source, wherein the current source receives the electric current generated by the energy harvesting circuitry,
    a second pad coupled to the status register circuit, wherein the status register circuit is coupled to the sensor loop for indicating a broken or unbroken status of the sensor loop, and
    a third pad coupled to ground of the RFID system; and
    a nonvolatile memory separate from and coupled to the status register circuit for storing a status of the sensor loop based on the status of the status register circuit;
    wherein the communication circuitry is configured to send the stored status of the loop to the RF reader.

2. The system of claim 1, wherein the RFID system is passive.

3. The system of claim 1, wherein the status register circuit is configured to indicate that the sensor loop has been broken even when the sensor loop is repaired after being broken, wherein the communication circuitry is further configured to send a status of the status register circuit in addition to the stored status.

4. The system of claim 1, wherein the system is configured to store a timestamp in the memory, the timestamp being indicative of a time when the stored status was obtained.

5. The system of claim 4, further comprising a first resistor between the energy harvesting circuitry and the second pad.

6. The system of claim 5, further comprising a second resistor coupled directly to the ground and the second pad, wherein the nonvolatile memory is system memory that is shared for other uses.

7. The system of claim 5, further comprising a second resistor coupled directly to the ground and the second pad.

8. The system of claim 1, wherein the status register circuit is configured to indicate that the sensor loop is unbroken when the sensor loop is repaired after being broken, wherein a broken status is stored in the memory when a broken sensor loop is detected even though the status register circuit indicates that the sensor loop is unbroken when the sensor loop is repaired after being broken.

9. The system of claim 1, wherein the system is not disabled when the sensor loop is broken, wherein the nonvolatile memory is system memory that is shared for other uses.

10. A Radio Frequency Identification (RFID) system, comprising:
    communication circuitry for enabling wireless communication with an RF reader;
    energy harvesting circuitry for generating an electric current from RF energy;
    a sensor loop coupled to the energy harvesting circuitry;
    a status register coupled to the sensor loop for indicating a broken or unbroken status of the sensor loop,
    a nonvolatile memory separate from and coupled to the status register for storing a status of the sensor loop based on the status of the status register,
    wherein the nonvolatile memory is system memory that is shared for other uses,
    wherein the RFID system is passive,
    wherein the sensor loop is external to a housing coupled to the communication circuitry and energy harvesting circuitry,
    wherein the sensor loop is coupled to a sensor node and also to ground,
    a first resistor between the energy harvesting circuitry and the sensor node, the sensor loop extending from the first resistor to the status register; and
    a second resistor between the ground and the sensor node, the second resistor being coupled to the sensor loop at a position on the sensor loop between the first resistor and the status register, the second resistor being directly coupled to sensor loop and to the ground.

11. The system of claim 10, wherein the communication circuitry is configured to send the stored status of the loop to the RF reader.

12. The system of claim 11, wherein the system is configured to store a timestamp in the memory, the timestamp being indicative of a time when the stored status was obtained, wherein the memory is system memory that is shared for other uses.

13. A Radio Frequency Identification (RFID) system, comprising: communication circuitry for enabling wireless communication with an RF reader; energy harvesting circuitry for generating an electric current from RF energy;
    a sensor loop coupled to the energy harvesting circuitry; a status register coupled to the sensor loop for indicating a broken or unbroken status of the sensor loop, wherein the system is not disabled when the sensor loop is broken; a nonvolatile memory separate from and coupled to the status register for storing a status of the sensor loop based on the status of the status register; and a second resistor coupled directly to the ground and the sensor node, wherein the communication circuitry is configured to send the stored status of the loop to the RF reader, wherein the system is configured to store a timestamp in the memory, the timestamp being indicative of a time when the stored status was obtained, wherein the communication circuitry is further configured to send a status of the status register in addition to the stored status, wherein the sensor loop is coupled to a sensor node and also to ground, and further comprising a first resistor between the energy harvesting circuitry and the sensor node.

14. The system of claim 13, wherein the RFID system is passive, wherein the nonvolatile memory is system memory that is shared for other uses.

15. The system of claim 13, wherein the status register is configured to indicate that the sensor loop has been broken even when the sensor loop is repaired after being broken.

16. The system of claim 13, wherein the system is operable to compare a voltage at the sensor node to one of the ground and a predetermined voltage.

17. The system of claim 13, wherein the status register is configured to indicate that the sensor loop is unbroken when the sensor loop is repaired after being broken, wherein a broken status is stored in the memory when a broken sensor loop is detected even though the status register indicates that the sensor loop is unbroken when the sensor loop is repaired after being broken.

18. A method, comprising: generating an electric current in a Radio Frequency Identification (RFID) device, the current energizing a sensor loop;
    detecting a status of whether the sensor loop is broken or unbroken; storing the status in both a status register and a nonvolatile memory for later retrieval; receiving a query from an RFID reader for the status; and sending the stored status to the RFID reader,
    wherein the status register is configured to indicate that the sensor loop is unbroken when the sensor loop is repaired after being broken; and further comprising storing a broken status in the memory when a broken sensor loop is detected even though the status register indicates that the sensor loop is unbroken when the sensor loop is repaired after being broken; and sending the broken status to the RFID reader, wherein the memory is system memory that is shared for other uses, wherein the status register is configured to indicate that the sensor loop has been broken even when the sensor loop is repaired after being broken.

19. The method of claim 18, wherein the RFID device is not disabled when the sensor loop is broken; and further comprising storing a timestamp in the nonvolatile memory, the timestamp being indicative of a time when the stored status was obtained; and sending the timestamp with the stored status to the RFID reader.

\* \* \* \* \*